Aug. 28, 1934.  R. C. BERGVALL  1,971,808
REGULATING SYSTEM
Filed May 11, 1933
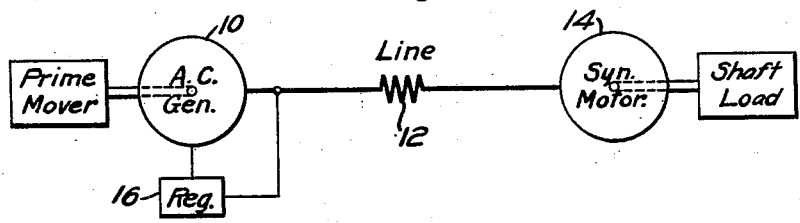
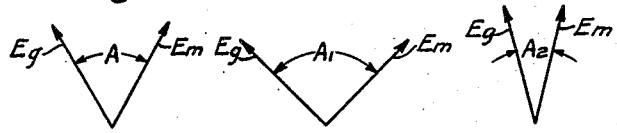
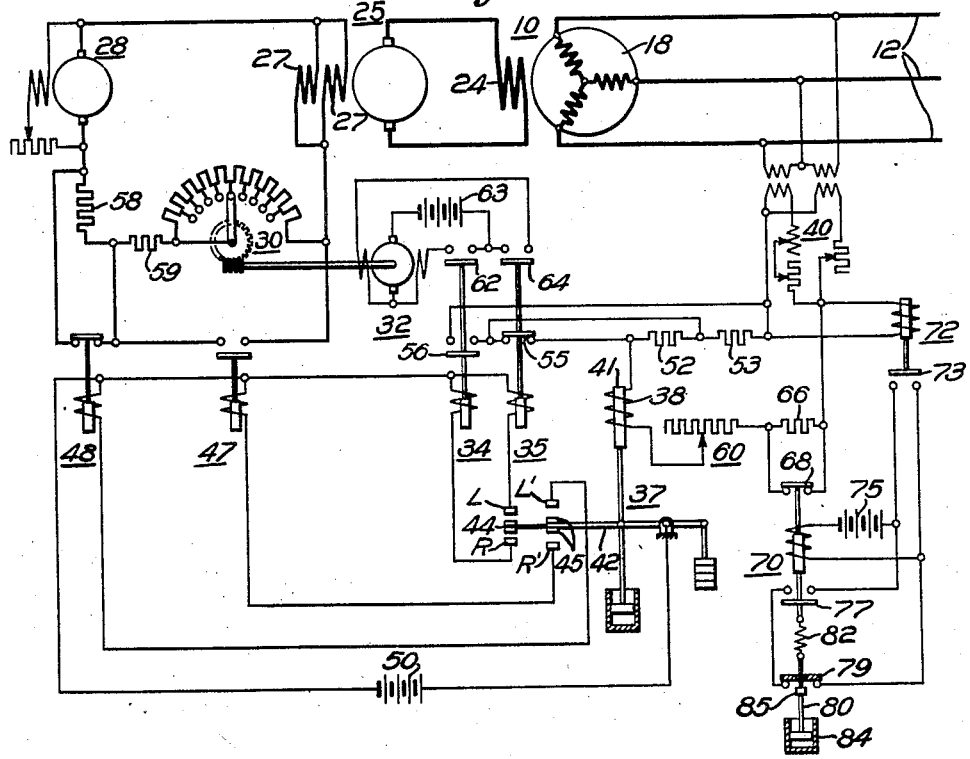
WITNESSES:
INVENTOR
Royal C. Bergvall.
BY
Franklin E. Hardy
ATTORNEY Patented Aug. 28, 1934

1,971,808

UNITED STATES PATENT OFFICE 1,971,808

REGULATING SYSTEM

Royal C. Bergvall, Wilkinsburg, Pa., assignor to Westinghouse Electric & Manufacturing Company, East Pittsburgh, Pa., a corporation of Pennsylvania Application May 11, 1933, Serial No. 670,489

10 Claims. (Cl. 171—119)

My invention relates to automatic voltage regulators utilized with electrical power systems involving interconnected synchronous machines and it has particular relation to means for causing such regulators to maintain the machine excitation at a value higher than normal when the power system is subjected to severe oscillations in its power angle.

In an alternating current electrical system, power flows principally by reason of a phase difference between the rotors of the synchronous machines at the sending and receiving ends or what amounts substantially to the same timing, a phase difference in the internal or generated electromotive forces of the machines at the opposite ends of the line, one characteristic of such a system being that the power flow varies as a sine function of this angular displacement.

It is known that such synchronous transmission systems are ordinarily oscillatory, that is, when the machine loads are suddenly changed or when the transmission circuit is subjected to a disturbance the system does not arrive at its final equilibrium at once but only after a series of oscillations in the power angle. During such severe oscillations as follow the clearing of a short circuit or result from other abnormal disturbances, it is found that the voltage at the synchronous machine terminals substantially exceeds the normal voltage during certain periods of the oscillation.

Automatic regulators which control the machine excitation in response to changes in the magnitude of circuit or machine voltage are thus caused to start to reduce the machine excitation during each of these periods of abnormal potential. Such reductions result in lessened system stability in that the weakening of the machine field allows the machine to fall out of synchronism much more readily than it otherwise would. As long as the severe system oscillations persist, which in the case of a typical circuit disturbance is for a period of the order of several seconds, any reduction in machine excitation should, therefore, preferably be avoided.

My invention is directed to simple and effective means for overcoming the disadvantages pointed out in the operation of automatic voltage regulators as applied to synchronous machines.

Generally stated, it is an object of my invention to increase the stability characteristics of electrical power circuits involving interconnected synchronous machines during periods of abnormal power-angle oscillations.

One object of my invention is to provide means for causing an automatic voltage regulator to increase the excitation of a synchronous machine controlled thereby whenever the power system of which the machine forms a part is subjected to abnormal power-angle oscillations.

Another object of my invention is to provide means whereby an automatic voltage regulator utilized with a synchronous-synchronous transmission system will maintain the system voltage at a value somewhat above normal during such time as abnormal power-angle oscillations may persist in the system.

A still further object of my invention is to provide means whereby the voltage setting of an automatic regulator utilized with a dynamo-electric machine may be raised for a predetermined period of time following a reduction in machine voltage below a given value.

In practicing my invention, I provide a voltage-setting raiser for the automatic regulator, which special device is made effective whenever the alternating current power system of which the regulator-controlled synchronous machine forms a part is subjected to abnormal power-angle oscillations. Such angular oscillations being, as is known, accompanied by abnormal fluctuations in machine voltage, I utilize in a preferred embodiment of my invention, a voltage-sensitive relay to control the auxiliary adjuster. Once the adjuster is thus made effective, timing means provided for the purpose maintain the regulator at the higher voltage setting for a period of time sufficient to allow the abnormal system oscillations to die out.

I have discovered that through such utilization of such compensating means to cause the regulator to maintain a higher value of machine excitation during the abnormal periods, the possibility of the machine falling out of synchronism is materially reduced and the stability of the power system is thereby substantially improved.

My invention, together with additional objects and advantages thereof, will best be understood through the following description of a specific embodiment when taken in conjunction with the accompanying drawing, in which Figure 1 is a single line diagrammatic representation of a power system comprising a synchronous machine to which the improved automatic voltage-regulator control of my invention is adapted, Figs. 2, 3 and 4 are diagrams of voltage vectors indicating certain characteristics of the system of Fig. 1, and Fig. 5 is a diagrammatic view of apparatus and circuits illustrating one preferred form of my invention applied to an automatic voltage regulator which controls the excitation of a synchronous generator forming a part of the power transmission system of Fig. 1.

Referring to the drawing and particularly to Fig. 1 thereof, the power system there illustrated comprises a prime-mover driven alternating-current generator 10 which is connected through a line or transmission circuit 12, to a synchronous motor 14 which drives a shaft load. To control the excitation of generator 10, an automatic regulator designated at 16 is utilized.

The vector diagram of Fig. 2 illustrates the voltage displacement relations for the system of Fig. 1 when the generator 10 supplies, at a given value of internal induced voltage $E_g$, a normal value of power current to the motor 14, the internal voltage of which is given by vector $E_m$. For such a condition, the generator voltage $E_g$ leads the motor voltage $E_m$ by an angle A of intermediate value.

Upon the occurrence of an abnormal system disturbance, such as a short circuit, the energy balance between generator 10 and motor 14 is seriously disturbed and the value of the power angle may be caused to suddenly increase to some larger value given by $A_1$ in Fig. 3. A system oscillation is thus started which may cause the power angle to swing back in the opposite direction to an exceedingly low value as represented by $A_2$ in Fig. 4. This will be followed by a series of increases and decreases in the phase angle, the amplitudes of which progressively become less so that eventually the system settles to and operates at a constant or equilibrium angle, such as the angle A of Fig. 2.

It has been shown that as two interconnected synchronous machines drift further apart in phase angle, as represented by the diagram of Fig. 3, the machine terminal voltages are caused to be substantially reduced due to the increased values of reactance drops which the raised power currents produce in the machine windings and to other causes. Likewise, as the machines approach each other in phase angle, as represented by Fig. 4, a corresponding rise in the terminal voltage of each machine results.

It is further known that the ability of a synchronous machine to stay in step with the voltage of an alternating current circuit to which it is connected is a function of the machine excitation, high values of excitation requiring high torques to effect pull-out or loss of synchronism and low values of excitation offering correspondingly small resistance to machine pull out. Consequently, it is desirable in a power system of the type under consideration to prevent the machine excitation from being reduced during the periods of abnormal power angle oscillation. To obtain this desirable result, I provide the special means illustrated in Fig. 5.

The power transmission system shown in Fig. 5 is a more detailed reproduction of the sending end only of the complete system shown in Fig. 1, it comprising the alternating current generator 10 illustrated as having armature windings 18 directly connected with the conductors of a three phase transmission circuit 12. The generator is provided with a field winding 24 which is energized from an exciter generator 25. This main exciter 25 is provided with a field winding 27, shown as being of the parallel path type to reduce inductive lag, which may be energized from any suitable source of substantially constant direct current potential such as an auxiliary or pilot exciter 28.

To control the voltage of the regulated generator 10, a motor-operated rheostat 30 is connected in circuit with the exciter field winding 27 to control the field current and hence the voltage impressed by the exciter 25 on the field winding 24 of the generator 10. The rheostat 30 is operated by a suitable reversible motor 32, the energization of which is controlled by the actuation of relays 34 and 35 which respectively cause the motor to be operated in the voltage-raising and the voltage-lowering directions.

Relays 34 and 35 are controlled by means of a contact making voltmeter or primary relay 37 that is responsive to the potential impressed upon an operating winding 38 thereof. Winding 38 is energized by the terminal voltage of machine 10 through a positive phase sequence network 40. Network 40 is for the purpose of supplying to the winding a single phase voltage which at all times is proportional to the positive phase sequence component of the three single phase voltages acting in the three phase circuit 12. Such networks, which are well known in the art, are more completely shown and described in United States Patent No. 1,571,224, granted February 2, 1926 to C. T. Allcutt.

Thus, an increase in the voltage of machine 10 increases the upwardly acting magnetic pull upon the armature member 41 thereof and causes the contact carrying member 42 to be moved upwardly, while a decrease in generator voltage similarly allows the member 42 to move downwardly.

In order that the regulating system may respond quickly to correct large variations in voltage, provision is made through the utilization of contactors 47 and 48, respectively, for short circuiting from and for inserting in the field control circuit relatively large blocks of resistance. Contactor 48, for example, when in its normal circuit closing position illustrated, establishes a shunt connection around a resistor 58. Likewise, contactor 47 is disposed to short circuit when required the field rheostat 30 and a resistor 59 when the contactor is actuated to its circuit closing position.

Relay device 37 is provided with two separate sets of contacts, a small change responsive set comprising members L, 44 and R and a large change responsive set comprising members L', 45 and R'. The small change responsive contacts function to control the rheostat motor control relays 34 and 35, while the large-change responsive contacts similarly control the actuation of resistor-shunting contactors 47 and 48. A battery 50 is shown as a source of energization for the relay circuits just named.

To change the voltage which the regulator will maintain at the terminals of machine 10, the usual voltage-adjusting rheostat 60 is included in the energizing circuit of primary relay 37. An increase in the resistance of rheostat 60 causes the regulator to maintain a higher generator voltage while a decrease in rheostat resistance similarly lowers the generator voltage.

In operation of the regulating system thus far described, a decrease in the voltage of generator 10 causes contact member 44 of primary relay 37 to be lowered into engagement with stationary member R, thereby completing from battery 50 a circuit which effects the actuation of relay 34. This relay accordingly moves its contact members upwardly completing a circuit through contact member 62 for energizing the rheostat operating motor 30 from a battery 63, in such manner that the motor adjusts rheostat 30 in the resistance lowering direction to thereby effect an increase in the excitation of machine 10 which is appropriate to raise the machine voltage back to the desired value.

Similarly, an increase in the voltage of machine 10 causes primary relay 37 to move the contact member 44 thereof upwardly into engagement with the stationary member L, thereby completing an actuating circuit for the relay 35 from the energizing source 50. This relay moves its contact members upwardly completing through contact member 64 a circuit for energizing, from source 63, rheostat operating motor 32 in a manner that the motor adjusts rheostat 30 in the resistance increasing direction to effect a reduction in the excitation and voltage of machine 10.

For the purpose of preventing hunting during operation of the regulator, auxiliary resistor sections 52 and 53 are disposed in the energizing circuit of contact making voltmeter 37. Normally section 52 is shunted from the circuit by means of an auxiliary contact member 55 carried by motor control relay 35, while resistor 53 is shunted by an auxiliary contact member 56 from the circuit only upon the actuation of rheostat motor control relay 34. These antihunting resistors serve to anticipate the voltage changes at the terminals of machine 10 effected by adjusting operations of rheostat 30 and thus cause the operations to be discontinued somewhat before the voltage correction has completely reached the desired value.

In the event that the voltage of machine 10 suddenly drops to an abnormally low value sufficient to effect the engagement of contact member 45 of relay 37 with stationary member R', there is completed through these members, an actuating circuit for contactor 47 which functions to establish a shunt connection around rheostat 30 and resistor 59 to thereby rapidly increase the voltage applied to field windings 27 of exciter 25. This rapid excitation increase continues until such time as the voltage of machine 10 has risen above the predetermined low value, at which time contact member 45 of relay 37 interrupts the actuating circuit of short circuiting contactor 47 and restores the excitation control to motor operated rheostat 30.

In a similar manner, an unusually large rise in the voltage of machine 10 completes through contact members 45 and L' of device 37 an actuating circuit for contactor 48, which contactor functions to remove a normally maintained shunt connection around resistor 58 and thus allows this resistor to become effective in the excitation-control circuit to reduce the current supplied to exciter windings 27. The resulting rapid reduction in machine excitation continues until the machine voltage has been reduced below the predeterminedly large value mentioned, at which time the excitation control is restored to the motor operated rheostat 30.

In order that the voltage regulating system may be prevented from reducing the machine excitation during periods of abnormal oscillation in the phase angle of the power system of which the regulated machine 10 forms a part, I provide in the voltage supply circuit of the control element of the regulator an auxiliary resistor or other impedance which is normally shunted from the circuit and inserted therein only upon the occasion of the abnormal disturbances referred to. In the system of Fig. 5, this auxiliary resistor is illustrated at 66 as being connected intermediate the positive phase sequence network 40 and the operating winding 38 of the primary relay 37 to which the network supplies a single phase voltage proportional to the potential of the circuit or machine regulated.

Normally, resistor 66 is short circuited by a contact member 68 of a relay device 70. The actuation of device 70 is controlled by any suitable means responsive to system-oscillation or circuit conditions which will be followed by such oscillations. In Fig. 5 such means are shown in the form of an undervoltage relay 72, which relay derives energization from circuit 12 through the network connection 40. This relay may be sensitive to decreases in circuit voltage in excess of a given magnitude.

As has been explained in connection with Figs. 2, 3 and 4, during certain periods of the power system oscillation, represented by the abnormally large angle conditions of Fig. 3, the machine terminal voltage is reduced to a value which is a substantial percentage below the normal or desired value. In practice, a reduction of 15 or 20% is usually indicative that abnormal power angle conditions, of the severity for which special excitation control is required, will result. Upon the occasion of such a reduction, undervoltage relay 72 allows its contact member 73 to move downwardly to complete an actuating circuit for relay 70, from a suitable energizing source shown in the form of a battery 75.

Upon such completion, relay 70 immediately moves its contact members upwardly, inserting resistor 66 into the regulator-supply circuit and completing, through an auxiliary member 77, a holding-in circuit which maintains the relay in its actuated position even though undervoltage device 72 may have opened the actuating circuit established through contact member 73.

As a result of the insertion into the contact making voltmeter energizing circuit of resistor 66, the potential impressed upon the winding 38 of the voltmeter 37 is so reduced that, to maintain it at the constant value required to effect a complete disengagement of the movable contact members 44 and 45 of the relay, the voltage of the generator 10 and the circuit 12 must be correspondingly raised, which, of course, requires that the excitation of the machine be similarly increased. This increased excitation will be maintained as long as the resistor 66 is active in the regulator supply circuit.

The holding-in circuit of relay 70 remains established for a predetermined period of time which may be adjusted to correspond to the time required for the abnormal oscillations in the power system to die out, which, in practice, is usually the order of several seconds.

Any suitable timing means may be utilized to accomplish this purpose. As shown in Fig. 5, such means comprise a second auxiliary contact member 79 through which a plunger rod 80, connected to the main plunger member of relay 70 by means of a tension spring 82, is allowed to freely move. Movement of rod 80 is restrained by a dashpot device 84 which, after a predetermined time following the actuation of relay 70 and the attending tensioning of spring 82, allows the rod to move upwardly a sufficient distance to bring a collar 85 into engagement with auxiliary contact member 79 to effect an upward movement thereof and an interruption of the holding-in circuit therethrough.

Upon the occasion of this circuit interruption, the relay 70 is allowed to return to the normal position shown, in which contact member 68 reestablishes the shunt connection around resistor 66 and thus restores the setting of the regulator to its normal voltage condition.

The size of the resistor 66 is so chosen that the increased value of voltage which the regulator is caused to maintain at generator 10 upon the insertion of this resistor is of the general order of 10% above normal, which increase is found to be sufficient to measurably strengthen the pull-out characteristics of the machine and yet not sufficiently abnormally high to cause harm to the power system equipment, especially since the period of time in which the higher setting is effective is relatively short being, as previously mentioned, of the order of several seconds only.

It will be appreciated that instead of the undervoltage relay 72, any other device which is capable of detecting excessive fluctuations in the power system angle may be utilized to initiate the insertion of the calibration raising resistor. For example, an over-voltage relay might instead be utilized or a machine current responsive device would likewise function with equal success.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. In combination with an automatic regulator disposed to control the voltage of a dynamo-electric machine forming a part of a synchronous-synchronous power-transmission system, means responsive to the occurrence of abnormal power-angle oscillations in said system for raising the voltage-setting of said regulator, and means for maintaining the regulator setting at the raised value for a given period of time.

2. In combination with an automatic regulator disposed to control the voltage of a dynamo-electric machine forming a part of a synchronous-synchronous power-transmission system, means responsive to the occurrence of abnormal power-angle oscillations in said system for raising the voltage-setting of said regulator, and means for maintaining the regulator setting at the raised value for a period of time which is coextensive with the maximum persistence of such oscillations.

3. In combination with an automatic regulator disposed to control the voltage of a dynamo-electric machine forming a part of a synchronous-synchronous power-transmission system, means responsive to the occurrence of abnormal power-angle oscillations in said system for raising the voltage-setting of said regulator to cause the regulator to abnormally strengthen the excitation of said machine and thereby improve the ability of the machine to remain in synchronism with the remainder of the power system, and means for maintaining the regulator setting at the raised value for a given period of time.

4. In combination with an automatic regulator disposed to control the voltage of a dynamo-electric machine forming a part of a synchronous-synchronous power-transmission system, means responsive to the occurrence of abnormal power-angle oscillations in said system for raising the voltage-setting of said regulator in order that it may effect an abnormal strengthening of the excitation of said machine to improve its ability to retain synchronism, and means for maintaining the regulator setting at the raised-voltage value for a given period of time which is at least as long as the maximum during which such abnormal power-angle oscillations are likely to persist.

5. In combination, an alternating-current power system comprising a synchronous machine, an automatic regulator disposed to control the excitation of said machine, a circuit for influencing the regulator in accordance with the terminal voltage of the machine, a resistor, relay means responsive to abnormal fluctuations in the power-angle of said alternating-current system for inserting the resistor into said circuit to thereby raise the voltage-setting of the regulator, and means for removing the resistor from the circuit upon the expiration of a predetermined period of time.

6. In combination with a regulator disposed to control the excitation of a synchronous machine comprised by a power system, a circuit for influencing the regulator by the machine voltage, an impedor, relay means for inserting said impedor into the said regulator circuit upon the occurrence of predeterminedly large fluctuations in the power angle of said system, and timing-circuit means for removing the impedor from the regulator circuit after a predetermined time.

7. In combination with an automatic voltage regulator disposed to control the excitation of a synchronous machine comprised by a power system, means for raising the voltage setting of the regulator, a relay responsive to abnormal fluctuations in the terminal voltage of the machine for making effective the setting-raising means, and means for returning the regulator to its normal setting after a given period of time.

8. In combination with an automatic voltage regulator disposed to control the excitation of a synchronous machine comprised by a power system, means for raising the voltage setting of the regulator, a relay responsive to abnormal fluctuations in the terminal voltage of the machine for making effective the setting-raising means, means for maintaining said first-named means effective after a subsistence of the initiating fluctuation, and means for returning the regulator to its normal setting upon the expiration of a given period of time.

9. In combination with an automatic regulator disposed to control the excitation of a dynamo-electric machine, a circuit for influencing the regulator by the voltage of the machine, a resistor, relay means for inserting the resistor into said circuit upon the occurrence of a predeterminedly large decrease in machine voltage, and timing means for removing the resistor from said circuit upon the expiration of a given period of time, the effect of said resistor being to raise the voltage setting of the regulator to thereby cause it to strengthen the machine excitation.

10. In combination, an electrical circuit, voltage-adjusting means therefor, a regulator disposed to control the operation of said adjusting means, a control circuit for influencing the regulator by the voltage of the electrical circuit, a resistor, relay means for inserting the resistor into said control circuit upon the occurrence of a predeterminedly large decrease in electrical circuit voltage, and timing means for removing the resistor from the control circuit upon the expiration of a given period of time.

ROYAL C. BERGVALL.